Figure 1:
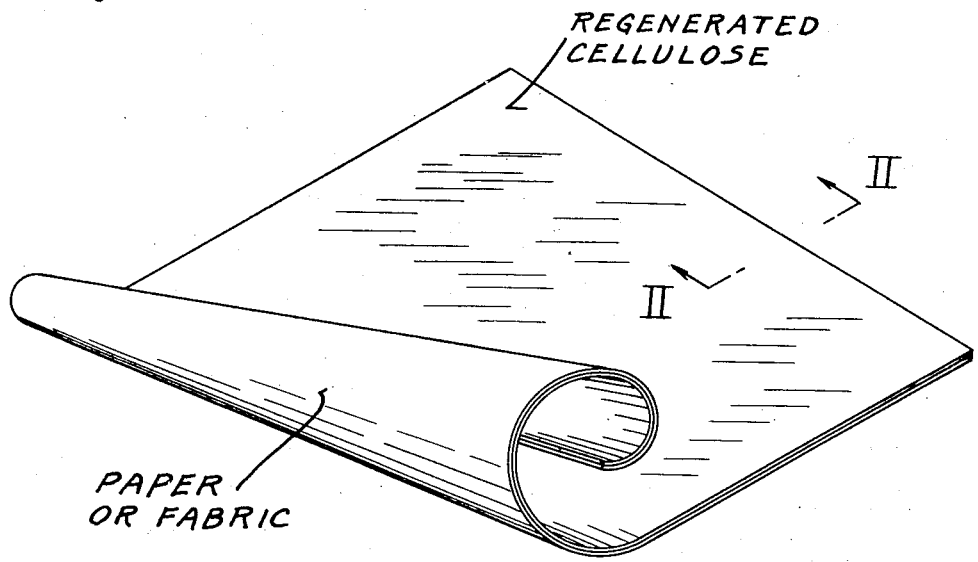

Sept. 4, 1934.  R. L. JENKINS  1,972,448
ADHESIVE COMPOSITION
Filed July 22, 1932

INVENTOR
R. L. Jenkins
BY
Herbert J Krase
ATTORNEY

Patented Sept. 4, 1934

1,972,448

UNITED STATES PATENT OFFICE 1,972,448

ADHESIVE COMPOSITION

Russell L. Jenkins, Anniston, Ala., assignor to Swann Research, Incorporated, a corporation of Alabama Application July 22, 1932, Serial No. 624,038

12 Claims. (Cl. 87—17)

This invention relates to an improved water resistant, self-healing adhesive.

One object of this invention is to provide a composition of matter which can be used for general adhesive purposes. Another object is to provide an adhesive composition which is insoluble in water or aqueous liquids generally, but is soluble in the common organic solvents. Another object is to provide an adhesive composition which shall be tasteless and odorless and which may be used for paper products such as food containers and the like. A further object of my invention is to provide an adhesive which shall be particularly adapted for cementing cellulosic bodies such as paper or regenerated cellulosic bodies as moistureproof cellophane together and which shall not cause the moisture resisting qualities of such cellophane to be impaired. It is also a further object of this invention to provide an adhesive which will not so penetrate paper or other porous cellulosic material as to cause unsightly markings to be visible on the reverse side of same, but will still penetrate the paper sufficiently to maintain a satisfactory bond.

It is well understood in the art that difficulties have been encountered in obtaining an adhesive suitable for these various requirements due to the fact that most of the bodies of this nature exhibit little adhesive power towards moistureproof cellophane or other regenerated cellulosic bodies. It is also understood that many proposed adhesives have the power of penetrating porous materials such as paper, thus causing unsightly stains and markings visible on the reverse side of the sheet on which the adhesive has been coated. It is furthermore desirable to obtain a thermoplastic material in which the thermoplasticity can be controlled, i. e., in which there is a greater temperature difference between the temperature at which the adhesive becomes brittle and the temperature at which it flows readily. This is a property of great importance with thermoplastic adhesives such as are here disclosed.

To the accomplishment of the foregoing and related ends, the invention then consists in the features hereinafter fully described and particularly pointed out in the claims, the following description setting forth but a few of the various ways in which the principle of the invention may be used.

This application is a continuation in part of my previous application filed February 25, 1932, Ser. No. 595,223.

I have now discovered that certain chlorinated polyphenyl hydrocarbons having two or more closed chains when admixed with a plasticizing body and a pigment produce adhesive compositions having decreased penetrating power with respect to such fibrous absorbent cellulosic bodies as paper and cloth, combined with improved bonding power on relatively non-absorbent surfaces such as moistureproof cellophane, varnished surfaces, metallic or ceramic objects. In addition, I have determined that surfaces coated with my adhesive are surprisingly resistant to the penetration of moisture. I have also found that the addition of an inert pigment to a mixture of the proper chlorinated polyphenyls and/or diphenyl to which between 1 and 20 percent of a plasticizer has been added results in increased strength and in a greater difference between the temperature at which the adhesive becomes brittle and the temperature at which it flows readily. In other words, this discovery enables me to use my adhesive compositions over a wider range of temperatures than was heretofore possible.

I have discovered that the addition of a pigment to the mixture of chlorinated hydrocarbon bodies and plasticizer gives increased strength and toughness to the adhesive bond. Another factor of considerable importance, especially where the adhesive is to be applied by means of heated rolls in a machine, is the lack of stringing of my adhesive at the application temperature. This is a property which is difficult to overcome in adhesives, and is objectionable because of the lack of smoothness of the adhesive layer when stringing occurs. My adhesive, however, can be applied in a smooth even film by means of heated rolls.

Figure 2:
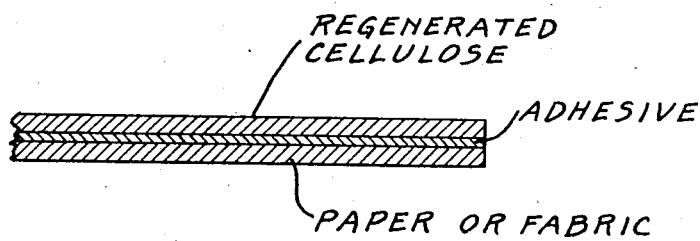

Figures 1 and 2 of the accompanying drawing are illustrative of one feature of my invention. Figure 1 shows in perspective a flexible sheeted product comprising a web of regenerated cellulosic material such as cellophane or moistureproof cellophane bonded by means of my adhesive to a web of absorbent fibrous cellulosic material such as paper or cloth. Figure 2 shows in enlarged view a cross section taken along the lines II—II of the details of the structure thus produced. Considerable variation may of course be made in the manufacture of composite structures of this class where increased resistance to moisture transmission is the end in view. In place of the regenerated cellulosic material shown, I may employ, of course, a sheet of paper or fabric or other sheeted material either coated or uncoated with varnish or lacquer when producing structures similar to that shown in the drawing. Due to the decreased moisture-transmitting properties of the adhesive bond, such structures may be employed for various purposes where it is desired to protect articles of food or chemicals either from loss of moisture or from absorption of atmospheric moisture.

Since the chlorinated polyphenyl hydrocarbons comprise an important part of my invention, I will describe their preparation in considerable detail.

Example I

Both the diphenyl and the mixed polyphenyl hydrocarbons used in my composition may be obtained by thermal synthesis from benzol, said synthesis being preferably carried out as described in French Patent No. 667,840. In the recovery of the diphenyl as produced by this synthesis a distillation is resorted to, the diphenyl being obtained from the pyrolysis product by carrying the distillation temperature up to 270° C. The residue after the diphenyl has been removed is composed of various complex higher boiling bodies herein referred to as polyphenyls. These complex hydrocarbon bodies or polyphenyls may be distilled at atmospheric pressure by further raising the temperature during distillation up to and above 400° C. A sample of these polyphenyls which has been distilled at atmospheric pressure was found to contain the following definite compounds:—

|  | Per cent |
|---|---|
| 1,2 diphenyl benzene | 4.3 |
| 1,3 diphenyl benzene | 58.8 |
| 1,4 diphenyl benzene | 29.5 |
| Ortho-triphenylene | 1.1 |
| Unidentified (dibiphenyl etc.) | 6.3 |

The above distillable fraction composed approximately 80% of the total high boiling bodies, the remaining 20% being, however, distillable in greater or less amount at less than atmospheric pressure.

For the purpose of this example, the chlorination of a mass of the above particularly mentioned high boiling bodies will be further described. Chlorination is effected in well known manner with the aid of chlorine gas, an iron catalyst being used to accelerate this reaction. When the mass has absorbed 40 to 45 percent, say 42 percent, of chlorine, chlorination is stopped and the product washed to remove free acid and iron chlorides and then distilled. Such distillation is continued until 85 to 95 percent has been distilled, the product being a light yellow transparent somewhat brittle and plastic mass, having a softening point in the neighborhood of 53° to 77° C., as determined by the Barrett ball and ring method.

Pigments

For the purpose of compounding my adhesive, I have found that a variety of pigments are available. Either barytes, zinc oxide, asbestine, silica, titanium oxide, lithopone, or iron oxide may be used. These are readily available on the market in a finely ground condition for use in the paint industry. As so prepared, they are in suitable condition for use in the present invention.

Compounding of the adhesive

Melt together 94 parts of the chlorinated polyphenyls containing say 42 percent of chlorine and 6 parts of a plasticizing body, such as for example, dibutyl phthalate and stir in while molten 47 parts of finely ground barytes. The adhesive may then be applied in the molten state directly to the objects to be cemented. For example, if moistureproof cellophane is to be cemented to kraft paper, the molten adhesive is applied to a sheet of the cellophane, is spread by means of doctor knives to give the desired thickness of coating, and the kraft paper is then pressed on to the adhesive surface. This operation can, of course, be more efficiently carried out by machine, for which I have found my adhesive to be particularly suited.

Changes may, of course, be made in the proportion and nature of the ingredients used in compounding the adhesive. For example, the amount of plasticizer may be increased depending on the degree of tackiness desired, an increasing amount of plasticizer tending to increase the tackiness and also the self healing properties. An increase in the amount of pigment will decrease the penetration of the adhesive into the absorbent sheet, which factor affords a means of controlling penetration. It is also desired to point out that the use of barytes as the pigment in the adhesive results in the production of an adhesive transparent in thin layers, which factor it is possible to put to valuable use, especially when cementing a transparent cellulosic material such as cellophane to paper sheet on which various designs have been printed for artistic or utilitarian purposes.

However, my adhesive composition is capable of still further variation. For example:—

Example II

If an adhesive body of higher melting point is desired for applications where the objects cemented together are to be subjected to a higher temperature, I preferably clorinate the mixture of polyphenyls mentioned under Example I to a higher chlorine content, say in the neighborhood of 60 to 63 percent chlorine. Such a body will have a softening point in the neighborhood of 125° C., and is to be mixed with a plasticizing body, say dibutyl phthalate and finely ground silica pigment, in the following proportions:—

|  | Parts by weight |
|---|---|
| Chlorinated polyphenyls, 125° softening point | 62.5 |
| Dibutyl phthalate | 5.4 |
| Finely ground silica | 32.1 |
|  | 100.0 |

Such an adhesive will naturally require a higher temperature for application, but will also withstand higher temperatures during use.

Example III

The melting point of the adhesive body may be further changed by incorporating with the polyphenyls mentioned in Example I above, before chlorinating, a certain proportion of diphenyl. For most purposes I prefer to mix say 60 parts of technical diphenyl with 40 parts of polyphenyls having a boiling range of from say 270° C. to 400° C. This mixture of hydrocarbons is chlorinated to a chlorine content of about 65%, using iron as a catalyst as before described and the black non-crystalline brittle body obtained is then distilled in a vacuum. The clear yellow non-crystalline material thus obtained, which will have a softening point in the neighborhood of 75° C., as determined by the Barrett ball and ring test, is now mixed with a plasticizing body in the proportion of 96 parts of the chlorinated body to 4 parts of the plasticizing body, say dibutyl phthalate, tricresyl phosphate or mineral oil, and a suitable pigment, the mixing taking place as described under Example I above. Application of the adhesive may be made directly by warming or from a suitable solvent.

By varying the proportion of polyphenyls and diphenyl, as well as the chlorine content of the mixture, considerable variation in such properties as softening point or application temperature may be obtained. In general, it may be said that chlorination of these bodies should be restricted to ranges wherein no crystallization takes place. By employing varying percentages of the polyphenyl bodies and diphenyl, non-crystalline resin-like products may be obtained having softening points varying all the way from below 50° to above 125° C. The advantages of such a range of softening points will be evident to those skilled in the art.

A specific formula which will yield a valuable moisture-resisting adhesive which will not tend to "string" during application by heated rolls above a temperature of 80° to 85° C. is the following:—

35.8 parts of the chlorinated diphenyl-polyphenyl mixture of Example III with a 75° C. softening point
4.2 parts mineral oil, refined, specific gravity 0.897
60.0 parts barytes, finely ground.

*Example IV*

A further specific formula which will give an adhesive composition with slightly better moisture-resisting properties is the following:—

44.75 parts of the chlorinated diphenyl-polyphenyl mixture of Example III with a 75° C. softening point.
5.25 parts of mineral oil, refined, specific gravity 0.897.
33.33 parts of titanium oxide (Commercial Titanox B)
16.67 parts asbestine.

*Example V*

The adhesive compositions described in Examples I to IV above exhibit no tendency to "draw up" when drawn out into a filament; in other words, they have no elasticity in the sense in which rubber possesses this property. This "rubbery" property can be imparted to my pigmented adhesive in limited degree by incorporating therewith a certain amount of a resin, either natural or synthetic. The following formula is illustrative of a composition having this "drawing up" or elastic property:—

31.6 parts of the chlorinated diphenyl-polyphenyl mixture of Example III with a 75° C. softening point
46.8 parts of No. 1 Singapore dammar
21.6 parts of mineral oil, refined, specific gravity 0.897
45.0 to 50.0 parts of finely ground silica.

A mixture such as the above-mentioned, which has been proportioned so as to give a refractive index approximately equivalent to that of silica, will be transparent in thin layers, and hence can be used where it is desired to employ a transparent adhesive.

Should it be desired to soften the adhesive so that application may be made at lower temperatures, a solvent may be added to my adhesive. Carbon tetrachloride, benzol or toluene, being miscible in all proportions with the chlorinated body, may be incorporated therewith in varying proportions to effect the degree of softness or fluidity desired. Application of the adhesive containing the solvent is then made in the usual manner, the latter usually being allowed to evaporate before the bond is completed.

The above examples illustrate several ways in which my improved adhesive may be produced and how it may be used. I have found it to be particularly valuable in cementing cellulosic bodies or regenerated cellulosic bodies such as paper, wood, cotton, or other textile fibers, metallic or ceramic bodies, etc. It is also of value in cementing cellophane or moistureproof cellophane articles to paper, cloth, or other fibrous bodies or in attaching celluloid sheets to glass.

My adhesive body as herein described is a sticky, self-healing thermoplastic water-insoluble body, clear and transparent in thin layers and white and opaque in masses, when distilled chlorinated polyphenyls or diphenyls are employed in its formulation and brown to black when the chlorinated bodies are utilized in their undistilled condition. They are soluble in the ordinary organic solvents such as carbon tetrachloride, benzol, toluol, gasoline, etc., in which form they may be applied if desired. They also exhibit self-healing properties, that is, if the adhesive union formed by adhesive composition is broken, the parts may be pressed together and reformation of the bond will take place. In most cases this reformation can be aided by slightly warming the joint.

In the production and use of my adhesive composition, attention should be given when selecting the plasticizing body, to the particular use for which the product containing same is designed. For example, because of its poisonous nature it is undesirable to use tricresyl phosphate when the adhesive is to enter into compositions coming into contact with foodstuffs, e. g., when it is used in cementing liners in bottle or jar caps.

The moistureproofness of my improved adhesive is of considerable importance especially where it is desired to bond moistureproof cellophane to paper or other sheet cellulosic materials. Tests of moistureproofness are made as described by Birdseye in Jour. Ind. Eng. Chem. vol. 21, page 575. Results of this test on moisture transmission thru moistureproof cellophane and also thru sheets of this cellophane cemented by means of my adhesive to kraft paper, together with a comparative test on an adhesive now on the market, are given below:—

*Results of moisture transmission tests*

| Material tested | Grams of H₂O vapor passed thru 23.8 sq. cm. of material in 24 hours |
| --- | --- |
| 1. Moistureproof cellophane | 0.0571 |
| 2. Moistureproof cellophane bonded to kraft paper. Adhesive used consisted of the chlorinated diphenyl-polyphenyl mixture in Example III, 89.5 parts+10.5 parts mineral oil | 0.0216 |
| 3. Moistureproof cellophane bonded to kraft paper. Adhesive used:—that described in Example III | 0.0429 |
| 4. Moistureproof cellophane bonded to kraft paper. Adhesive used:—that described in Example IV | 0.0240 |
| 5. Moistureproof cellophane bonded to kraft paper. Adhesive used:—well-known standard adhesive now on market | 0.3274 |

The results of the above tests indicate the great moistureproofing qualities of my adhesive, it being apparent from the above test results that application of my adhesive results in a marked decrease in the rate of moisture transmission over that possessed by moistureproof cellophane itself. It will be noted that the standard cellophane adhesive tested above actually increases the rate of moisture transmission. This discovery makes it possible to combine, by this means, various sheeted materials which do not possess substantial moisture-resisting properties in themselves into a composite structure which has the desirable moisture-resisting properties.

While I have described several embodiments of my invention, it will be apparent to those skilled in the art that it is not so limited but that it is susceptible of various changes and modifications without departing from the spirit thereof, and I desire therefore that only such limitations shall be placed thereon as may be imposed by the prior art or as are specifically set forth in the appended claims.

What I claim is:—

1. An adhesive with reduced penetrating power which is thermoplastic, self-healing, substantially odorless and tasteless and which is comprised of chlorinated polyphenyls, a plasticizer and a pigment.

2. An adhesive with reduced penetrating power which is thermoplastic, self-healing, substantially tasteless and which is comprised of chlorinated polyphenyls, a plasticizer, a solvent and a pigment.

3. An adhesive with reduced penetrating power which is thermoplastic, self-healing, substantially odorless and tasteless and which is comprised of chlorinated polyphenyls, a plasticizer and a pigment.

4. A non-stringing adhesive comprised of chlorinated polyphenyls, a plasticizer and a pigment.

5. A non-penetrating and thermoplastic adhesive composition which is comprised of chlorinated polyphenyls, a resin, a plasticizer and a pigment.

6. A non-penetrating and thermoplastic adhesive composition which is comprised of chlorinated polyphenyls containing more than 42 percent of chlorine, a plasticizer and a pigment associated therewith.

7. A non-penetrating and thermoplastic adhesive composition which is comprised of chlorinated polyphenyls and chlorinated diphenyl, said chlorinated bodies averaging more than 60 percent of chlorine, a plasticizer and a pigment.

8. A non-penetrating and thermoplastic adhesive composition which is comprised of a chlorinated mixture of diphenyl and polyphenyls, said chlorinated mixture having a softening point in the range of 70° to 80° C., together with a plasticizing body and a pigment.

9. A non-penetrating moisture-resisting thermoplastic adhesive composition which is comprised of a chlorinated mixture of diphenyl and polyphenyls, said chlorinated mixture having a softening point in the range of 70° to 80° C., together with mineral oil and a pigment.

10. An adhesive consisting of the following ingredients in parts by weight:

| | |
|---|---|
| Chlorinated polyphenyl resin, 125° C. softening point | 62.5 |
| Dibutyl phthalate | 5.4 |
| Finely ground silica | 32.1 |

11. An adhesive consisting of the following ingredients, in parts by weight:

| | |
|---|---|
| Chlorinated diphenyl-polyphenyl resin, 75° C. softening point | 44.75 |
| Mineral oil | 5.25 |
| Titanium oxide (titanox) | 33.33 |
| Asbestine | 16.67 |

12. An adhesive consisting of the following ingredients in parts by weight:

| | |
|---|---|
| Chlorinated diphenyl-polyphenyl resin, 75° C. softening point | 31.6 |
| Dammar | 46.8 |
| Mineral oil | 21.6 |
| Sicila, finely ground | 40 to 50 |

RUSSELL L. JENKINS.